(12) United States Patent
Simon et al.

(10) Patent No.: US 11,460,134 B2
(45) Date of Patent: *Oct. 4, 2022

(54) RELEASABLE CONNECT/DISCONNECT FITTING CONNECTION

(71) Applicant: IPEX TECHNOLOGIES INC., Oakville (CA)

(72) Inventors: Jis Simon, Brampton (CA); Filippo Martino, Oakville (CA); Ivan Lee Stiehl, Burlington (CA); James Bruce Anthony Campbell, Mississauga (CA); Raymond George Puache, Toronto (CA); Paul Agapito, Toronto (CA); Qing Li, Oakville (CA)

(73) Assignee: IPEX TECHNOLOGIES INC., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,967

(22) Filed: Oct. 20, 2020

(65) Prior Publication Data

US 2021/0033232 A1    Feb. 4, 2021

Related U.S. Application Data

(63) Continuation of application No. 15/892,652, filed on Feb. 9, 2018, now Pat. No. 10,844,988.

(30) Foreign Application Priority Data

Mar. 6, 2017   (CA) .................................. CA 2960023

(51) Int. Cl.
*F16L 37/091* (2006.01)
*F16L 37/084* (2006.01)
(Continued)

(52) U.S. Cl.
CPC ....... *F16L 37/0915* (2016.05); *F16L 37/0845* (2013.01); *F16L 37/0982* (2013.01); *F16L 37/0985* (2013.01); *F16L 21/08* (2013.01)

(58) Field of Classification Search
CPC . F16L 37/091; F16L 37/0982; F16L 37/0985; F16L 37/0987
See application file for complete search history.

(56) References Cited

U.S. PATENT DOCUMENTS

| 4,111,464 A | 9/1978 | Asano et al. |
| 6,199,920 B1 | 3/2001 | Neustadtl |

(Continued)

FOREIGN PATENT DOCUMENTS

EP    0 397 942 A1    11/1990

OTHER PUBLICATIONS

First Examination Report issued from Indian Patent Office with respect to corresponding Indian Application 2018/14008062 dated Jun. 21, 2021.

*Primary Examiner* — David Bochna

(57) ABSTRACT

A connection to releasably connect and disconnect to a pipe to a fitting provides a pipe fitting body for receiving a pipe and a retaining ring located within the fitting body for retaining and releasing the pipe. The retaining ring has axially extending resilient retaining tabs, each of which has a radially inwardly extending portion for engaging the pipe, and, a radially outwardly extending portion which extends through corresponding radial openings in the fitting body. When the pipe is inserted into the fitting body to an inserted position and the retaining ring is in the first locked axial position, the radially inwardly extending portions engage and retain the pipe in the inserted position. Relative axial movement of the retaining ring with respect to the fitting body from the first locked axial position to a second unlocked axial position causes the radially outwardly (Continued)

extending portions to operatively engage the corresponding body radial openings to resiliently radially outwardly deform each resilient retaining tab thereby disengaging the radially inwardly extending portions from the pipe and permitting removal of the pipe from the inserted position.

16 Claims, 8 Drawing Sheets

(51) Int. Cl.
      *F16L 37/098*     (2006.01)
      *F16L 21/08*      (2006.01)

(56) References Cited

U.S. PATENT DOCUMENTS

| | | |
|---|---|---|
| 8,696,037 B2 | 4/2014 | Nakamura |
| 10,844,988 B2 * | 11/2020 | Simon ................. F16L 37/0982 |

\* cited by examiner

Fig. 8
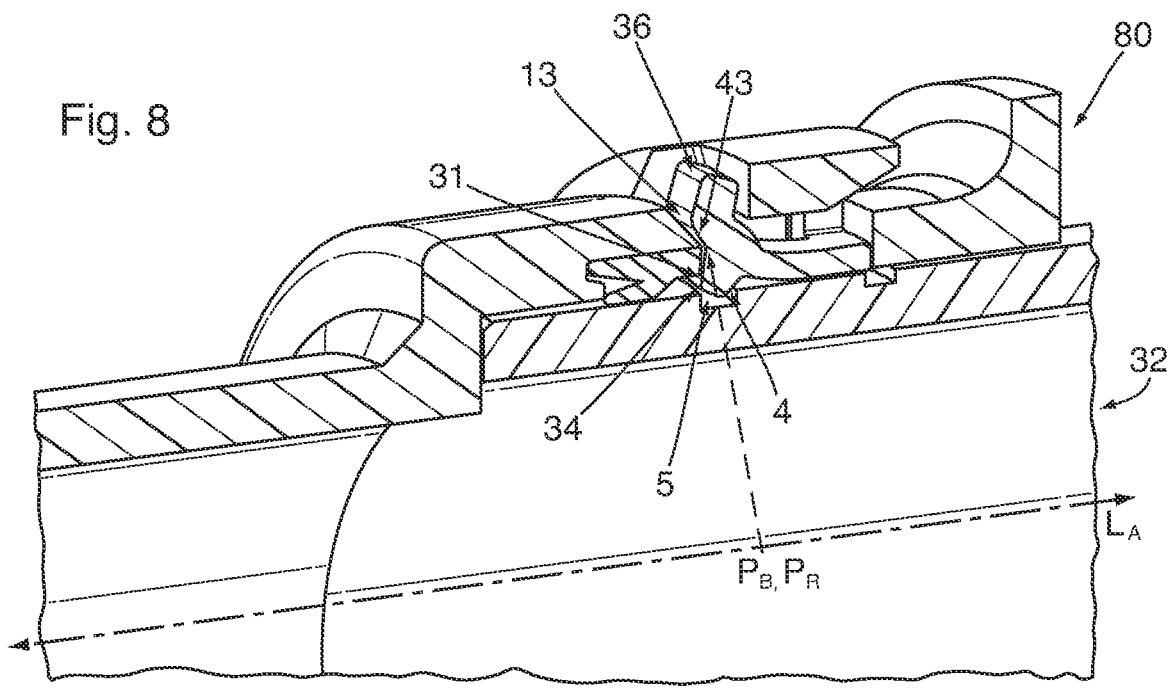
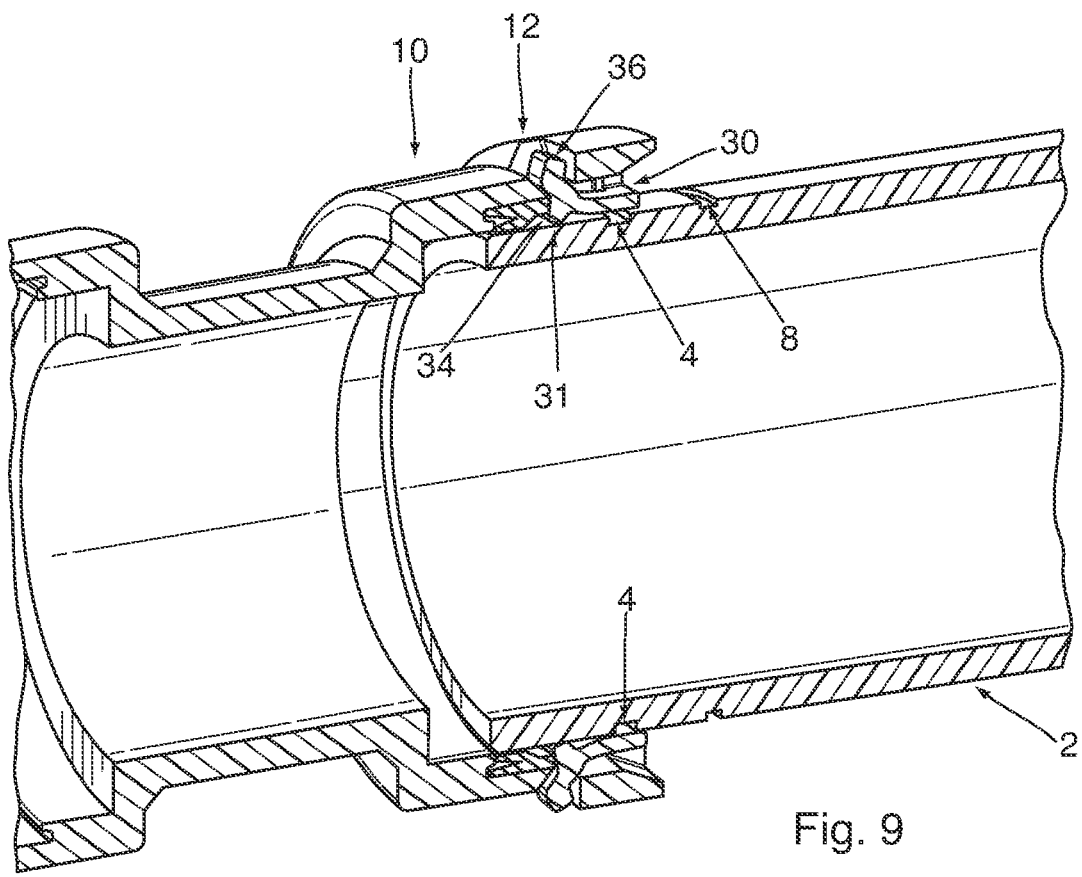
Fig. 9

RELEASABLE CONNECT/DISCONNECT FITTING CONNECTION

CROSS-REFERENCE TO RELATED APPLICATIONS

This application is a continuation of U.S. patent application Ser. No. 15/892,652, filed Feb. 9, 2018, now issued as U.S. patent Ser. No. 10/844,988 which is hereby incorporated by reference in its entirety.

FIELD OF THE INVENTION

The invention relates to a releasable connect/disconnect fitting connection. The fitting connection could be integrally formed with a fitting, such as a pipe connector, a tee fitting, or an elbow fitting. The releasable connect/disconnect fitting permits relatively quick connection and disconnection of a pipe to a-fitting by a mechanical type connection.

BACKGROUND OF THE INVENTION

In the past, there have been many different types of fitting connections to provide a connection between a pipe and a fitting through a mechanical type connection. However, the prior art connections suffer from the disadvantage that the connection is generally permanent, meaning that the fitting or connection must be destroyed or disassembled to remove the pipe. Also, the prior art connections generally do not permit relative rotation of the pipe and fitting after installation, as in many prior art connections are a solvent welded joint which generally use volatile organic solvent cements. In other words, there is no relatively efficient and/or quick manner to disconnect a pipe from a fitting once it has been connected and then reconnect another pipe or the same pipe to the fitting.

SUMMARY OF THE INVENTION

Accordingly, it is an object of this invention to at least partially overcome some of the disadvantages of the prior art. Also, it is an object of this invention to provide an improved type of connection which provides more efficient connection and disconnection of a pipe to a fitting.

Accordingly, in one aspect of the present invention, there is provided a connection to connect and disconnect a pipe to a fitting, the connection comprising: a fitting body having a pipe opening for axially receiving a pipe along a longitudinal axis and having at least one body radial opening, each body radial opening having an angled tab engaging surface; a retaining ring having at least one axially extending resilient retaining tab, each resilient retaining tab having a radially inwardly extending portion and a radially outwardly extending portion; wherein each of said radially outwardly extending portions have a chamfered body engaging surface which operatively engages the angled tab engaging surface of a corresponding body radial opening; wherein said radially inwardly extending portions engage the pipe when the pipe is in an inserted position and the retaining ring is in a first locked axial position to retain the pipe in the inserted position; wherein relative axial movement of the retaining ring with respect to the fitting body from the first locked axial position to a second unlocked axial position causes the chamfered body engaging surface of each radially outwardly extending portion to operatively engage the angled tab engaging surface of the corresponding body radial opening to resiliently radially outwardly deform each resilient retaining tab disengaging the radially inwardly extending portions from the pipe to permit removal of the pipe from the inserted position in the fitting body.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 8 is a detailed view of the connect/disconnect fitting connection shown in FIG. 6 with the retaining ring in the second unlocked position permitting removal of the pipe.

FIG. 9 is a cross-sectional perspective view of the connect/disconnect fitting connection shown in FIG. 2 with a pipe being inserted into the pipe connection to releasably connect the pipe to the pipe opening of the connect/disconnect fitting connection.

DETAILED DESCRIPTION OF THE PREFERRED EMBODIMENTS

Figure 1:
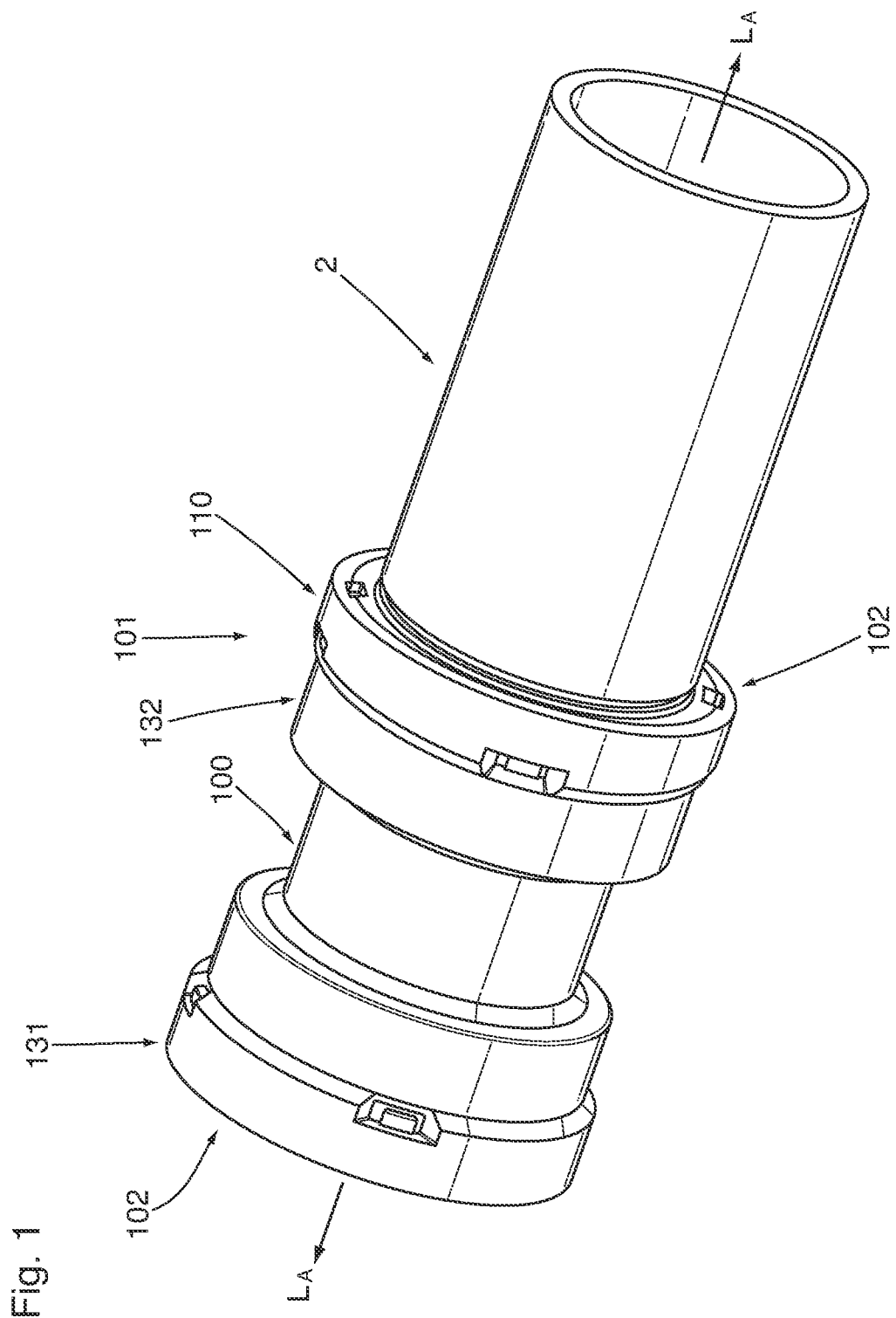
FIG. 1 is an external perspective view of a pipe coupling having a connect/disconnect fitting connection according to one embodiment of the present invention at both ends of the pipe coupling with a pipe inserted at one end of the pipe coupling.

Preferred embodiments of the invention and its advantages can be understood by referring to the present drawings.

In the present drawings, like numerals are used for like and corresponding parts of the accompanying drawings. Also, the following preferred embodiments and detailed description illustrate and describe non-limiting features of the invention.

One or more of the preferred embodiments described herein relates to a connection to releasably connect a pipe to a fitting. The fitting can be any type of fitting. The connection preferably comprises a fitting body having a pipe opening for axially receiving a pipe along a longitudinal axis. The connection also comprises a retaining ring having at least one, and preferably two, four, six or eight (depending on the size of the connection and the pipe) forwardly extending resilient retaining tabs, each resilient retaining tab having a radially inwardly extending portion, and, a radially outwardly extending portion. The radially inwardly extending portions are operable to engage the pipe when the pipe is in the inserted position and the retaining ring is in a first locked axial position to retain the pipe in the inserted position. Preferably, the pipe will have at least one groove, and/or other types of indentation, and the radially inwardly extending portions will engage the indentations, such as the at least one groove, as the pipe is inserted into the connection. The radially outwardly extending portions extend through a corresponding body radial opening of the fitting body. The radially outwardly extending portions have a chamfered body engaging surface which operatively engages an angled tab engaging surface of the corresponding body radial opening through which it passes.

Insertion of the pipe into the connection can be made in a number of ways, including simply manually inserting the pipe into the pipe opening of the fitting body. Typically, no solvent or other chemical means or chemical pre-treatment of the pipe or the connection are required. However, it is preferred if the pipe has at least one surface indentation, such as a groove, or dimples, or other types of indentations, formed on the exterior of the pipe prior to insertion of the pipe info the pipe opening, which groove, or other indentations, may be engaged by the radially inwardly extending portions of the forwardly extending resilient retaining tabs.

When the pipe is to be removed or disconnected from the pipe connection, relative axial movement of the retaining ring with respect to the fitting body from a first locked axial position to a second unlocked axial position causes the chamfered body engaging surfaces of each of the radially outwardly extending portions to operatively engage the angled tab engaging surface of the corresponding body radial opening to resiliently radially outwardly deform each of the resilient retaining tabs. This causes the radially inwardly extending portions of the resilient retaining tabs to disengage from the pipe permitting removal of the pipe from the inserted position in the fitting body. Preferably, the connection further comprises a separate removal tool which can engage the retaining ring to relatively axially move the retaining ring with respect to the fitting body from the first locked axial position to the second unlocked axial position. More preferably, the retaining ring is annularly shaped and substantially contained within the fitting body. The removal tool may fit between the pipe and the pipe opening of the fitting body to engage the retaining ring permitting axially movement of the retaining ring from the first locked axial position to the second unlocked axial position by moving the retaining ring further into the pipe opening of the fitting body.

These and other preferred embodiments, as well as non-limiting features of the invention will be further described below in more detail with respect to the Figures.

As shown in FIG. 1, one embodiment of the present invention relates to a fitting, shown generally by reference numeral 100, having a connection, shown generally by reference numeral 110, according to one embodiment of the present invention. The connection 110 may connect and disconnect a pipe, shown generally by reference numeral 2, to the fitting 100. As shown in FIG. 1, the fitting 100 is a pipe coupling 101, however, it is understood that the connection 110 could be used with any type of fitting, including, but not limited to, elbow fittings, tee fittings, wye fittings, pipe reducing fittings and pipe expanding fittings, P traps, S traps, end caps, as well as various types of flanges. The connection 110 is also mechanical, in that no solvents or other chemicals are required.

Furthermore, in the embodiment illustrated in the present figures, the pipe coupling 101 has a first end 131 and a second end 132 for coupling two pipes together. In the embodiment illustrated in the present figures, the pipe coupling 101 has a connection 110 according to the present invention at both ends 131, 132. However, it is understood that it is not necessary that the pipe coupling 101 have a pipe connection 110 according to the present invention at both ends 131, 132, and only one of the ends 131, 132 may have a connection 110 according to the present invention.

Figure 4:
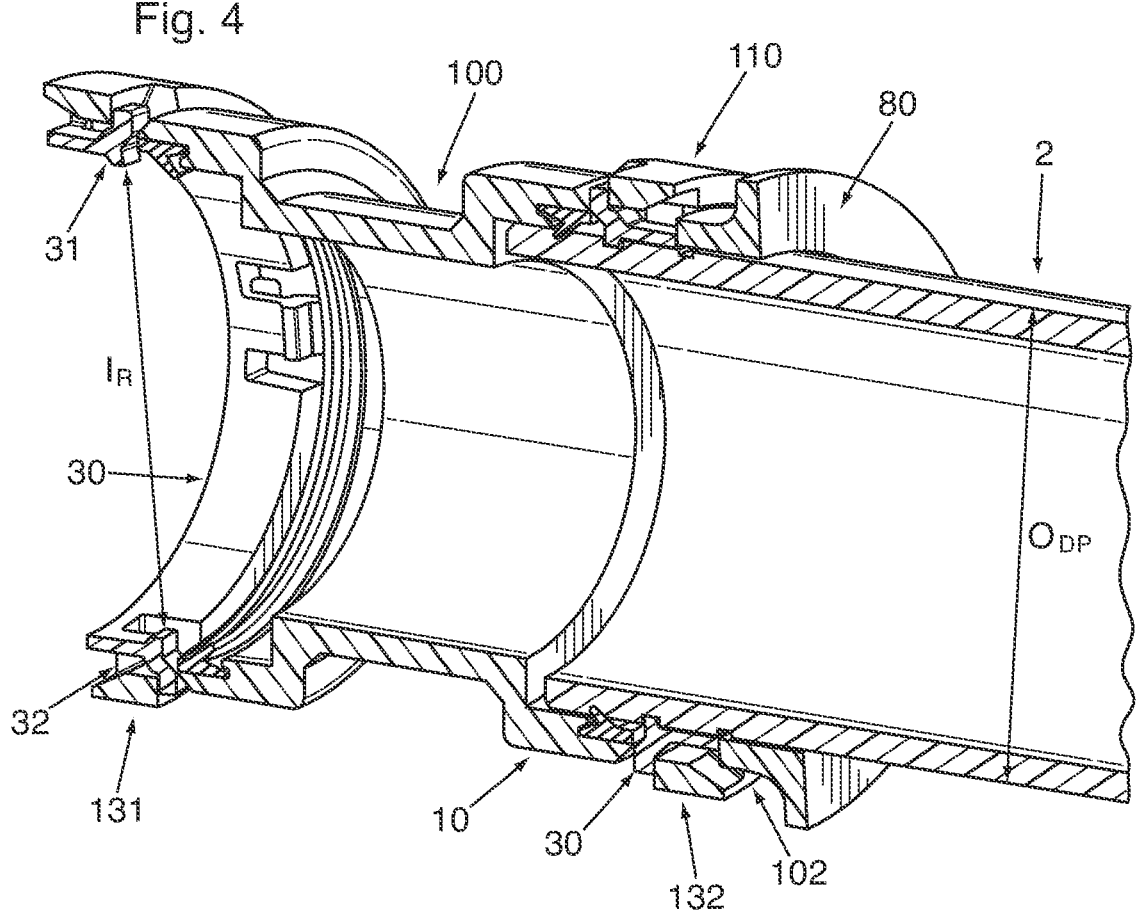
FIG. 4 is a cross-sectional view of the connect/disconnect fitting connection shown in FIG. 2 with the pipe in the inserted position and the pipe removal tool about to engage the retaining ring according to one embodiment of the present invention.
Figure 5:
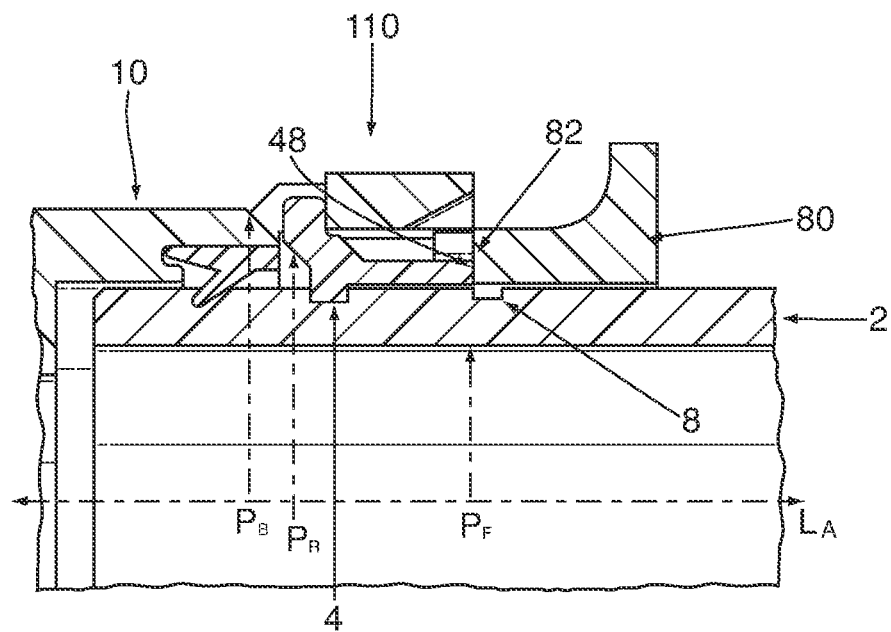
FIG. 5 is a cross-sectional view of the connect/disconnect fitting connection shown in FIG. 4 in more detail with the pipe in the inserted position and the pipe removal tool about to engage the retaining ring.
Figure 6:
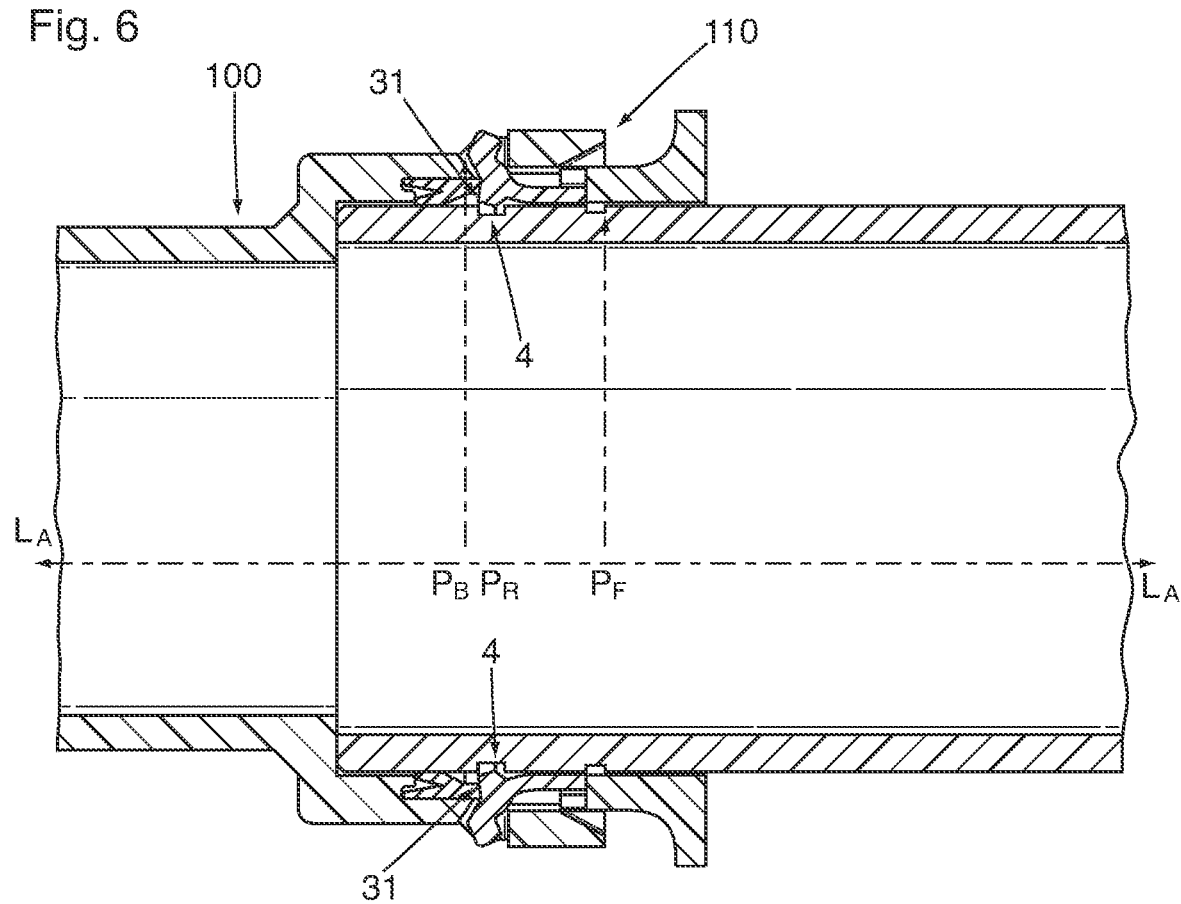
FIG. 6 is a cross-sectional view of the connect/disconnect fitting connection shown in FIG. 4 with the pipe in the inserted position and the pipe removal tool engaging the retaining ring to relatively axially move the retaining ring with respect to the fitting body from the first locked axial position to the second unlocked axial position permitting removal of the pipe.
Figure 7:
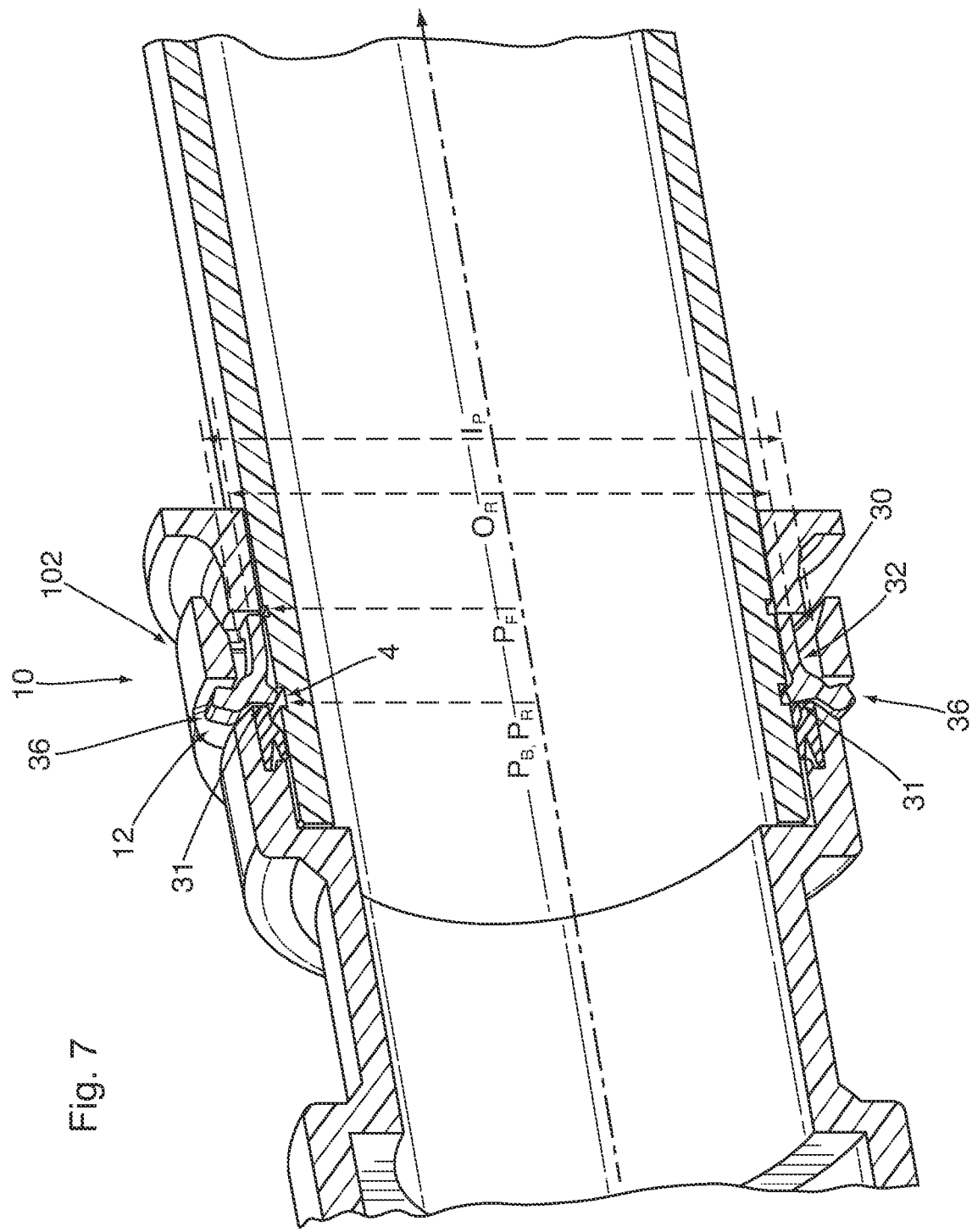
FIG. 7 is a cross-sectional view of the connect/disconnect fitting connection shown in FIG. 6 with the retaining ring in the second unlocked position permitting removal of the pipe.
Figure 10:
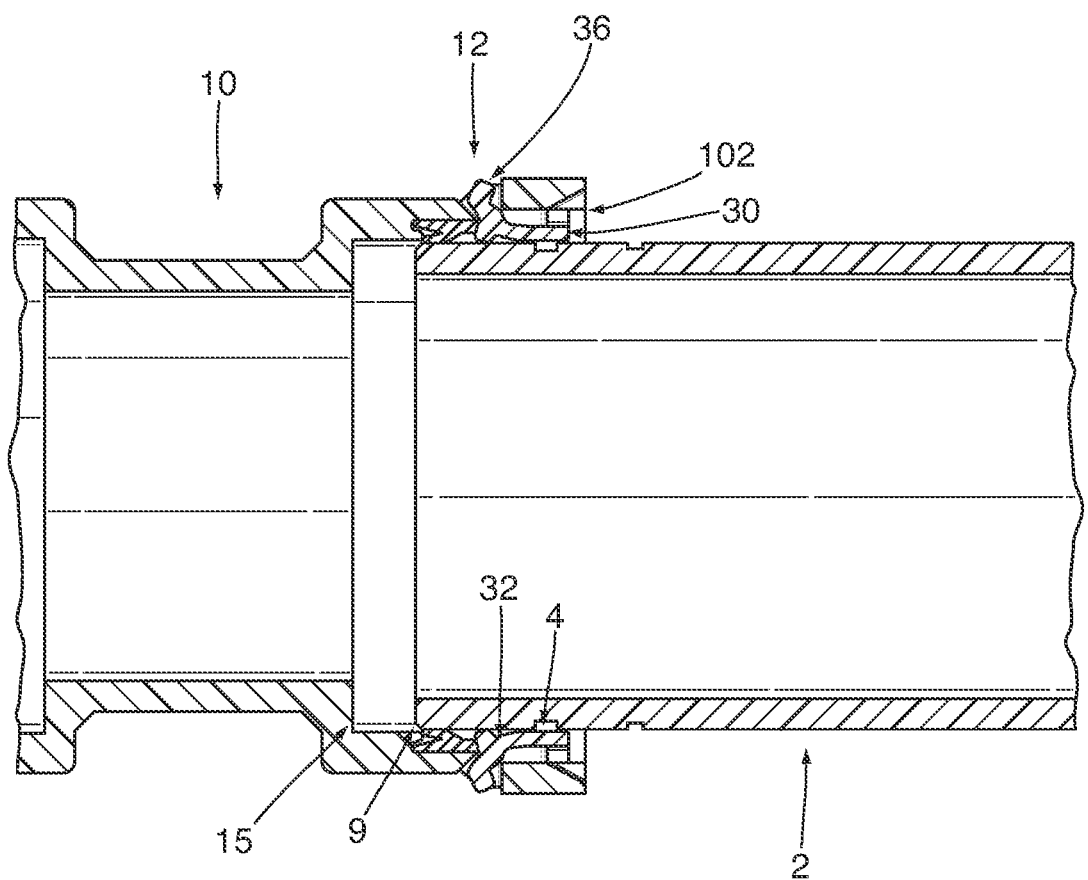
FIG. 10 is a cross-sectional view of the connect/disconnect fitting connection shown in FIG. 9 with a pipe being inserted into the pipe opening of the pipe connection to releasably connect the pipe to the connect/disconnect fitting connection.
Figure 11:
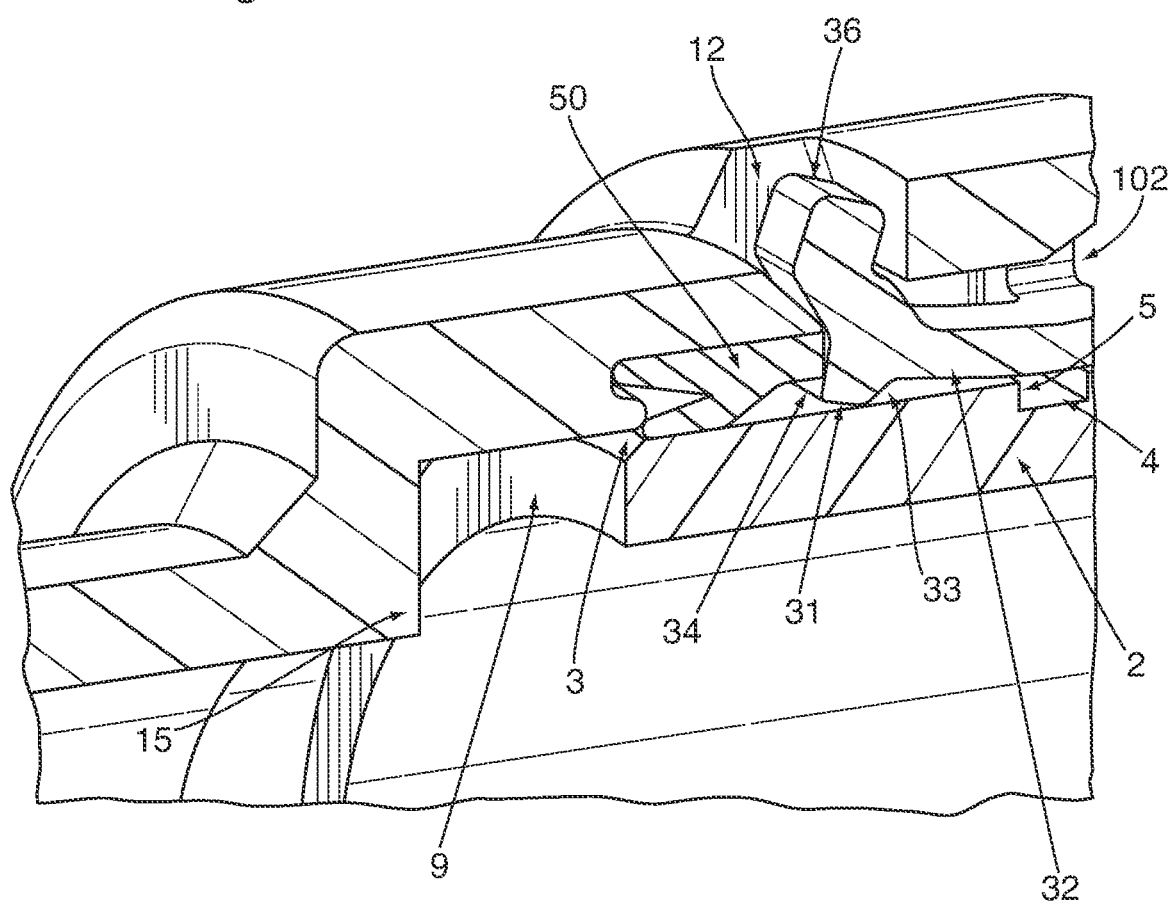
FIG. 11 is a detailed view of FIG. 9 with a pipe being inserted into the pipe opening of the pipe connection to releasably connect the pipe to the connect/disconnect fitting connection.

For ease of illustration, while both ends 131, 132 of the pipe coupling 101 illustrated in the figures have connections 110 pursuant to at least some embodiments of the present invention, pipe 2 is shown being inserted only into the second end 132 of the pipe coupling 101. The first end 131 of the pipe coupling 101 shows the pipe connection 110 without a pipe (not shown) inserted to assist in illustrating the pipe connection 110, but it is understood that in use, a pipe (not shown) would be connected to the pipe connection 110 at the first end 131 also. Furthermore, as described in the brief description, FIGS. 1, 2 and 3 of the present invention illustrate the pipe 2 in the inserted position at the second end 132 with the connection 110 engaging the pipe 2 to resist removal of the pipe. FIGS. 4 and 5 illustrate the connection 110 about to be disengaged from the pipe 2 to permit removal of the pipe. FIGS. 6, 7 and 8 illustrate the connection 110 disengaging from the pipe 2 to permit removal of the pipe. FIGS. 9,10 and 11 illustrate the initial insertion of the pipe 2 into the second end 132 of the pipe coupling 101 prior to the connection 110 engaging and connecting to the pipe 2.

Figure 2:
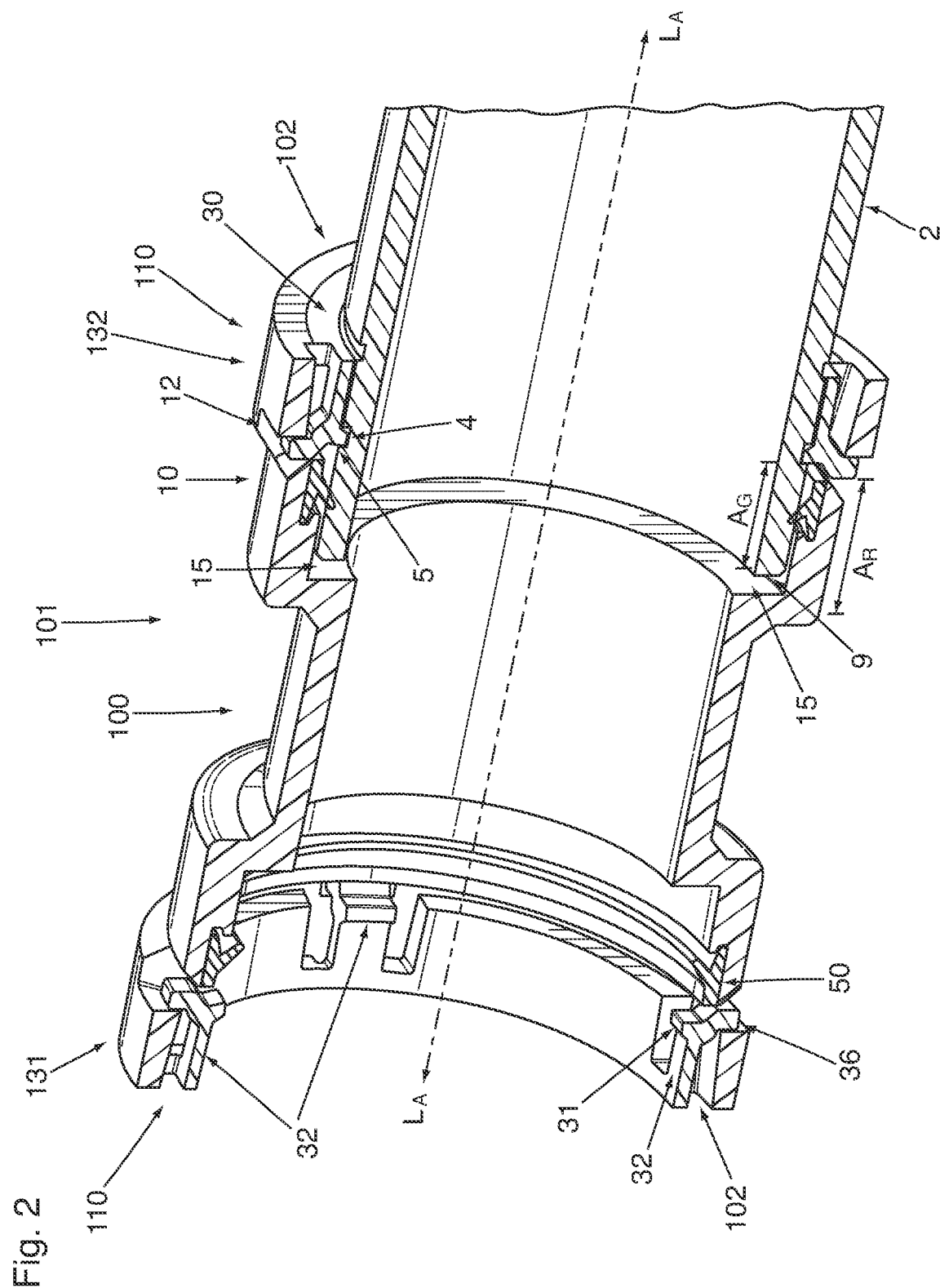
FIG. 2 is a cross-sectional perspective view of the pipe coupling shown in FIG. 1 with a connect/disconnect fitting connection according to one embodiment of the present invention at both ends of the pipe coupling and a pipe in the inserted position at one end of the pipe coupling with the retaining ring in the first locked axial position.
Figure 3:
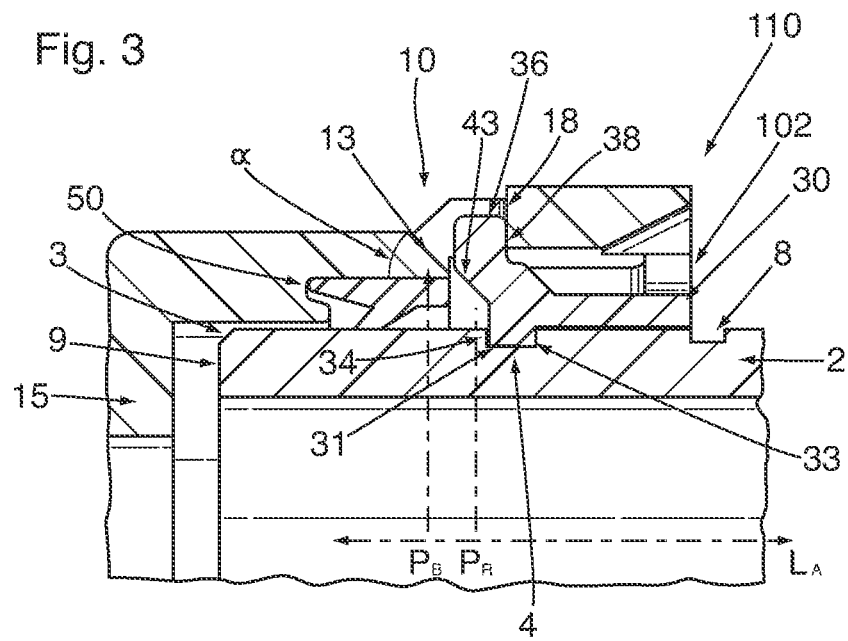
FIG. 3 is a cross-sectional view of the connect/disconnect fitting connection shown in FIG. 2 in more detail with the pipe in the inserted position and the retaining ring in the first locked axial position.

As illustrated in FIGS. 1, 2 and 3, the connection 110 preferably comprises a fitting body 10 having or defining a pipe opening 102 of the fitting 100 for axially receiving the pipe 2 along a longitudinal axis, shown generally by the dash lines identified as $L_A$ in FIGS. 1 and 2. The fitting body 10 also preferably comprises at least one, and likely two or more, body radial openings, shown by reference numeral 12, extending radially from the longitudinal axis $L_A$. Each body radial opening 12 has an angled tab engaging surface 13, illustrated for instance in FIGS. 2 and 3.

The connection 110 also preferably comprises a retaining ring, shown generally by reference numeral 30, having at least one, and preferably two or more axially extending resilient retaining tabs 32. Each resilient retaining tab 32 has a radially inwardly extending portion 31 and a radially outwardly extending portion 36. Preferably, the number of retaining tabs 32 will be the same, or less than, the number of body radial openings 12, such that each outwardly extending portion 36 of the retaining tab 32 will be received by and/or pass through a corresponding body radial opening 12. Furthermore, it is understood that the retaining tabs 32 and the body radial openings 12 are preferably equally radially spaced about the connection 110 and the total number of body radial openings 12 and retaining tabs 32 will be a function of the size of the pipe to be inserted into the connection 110, the type of pipe and other design constrains and requirements. Accordingly, depending on the size of the pipe 2, there may be 2, 3, 4, 6, 8 or more body radial openings 12 and a corresponding number of retaining tabs 32. Generally, there will be an even number of body radial openings 12 and corresponding retaining tabs 32 located equidistantly about the circumference of the opening 102. It is understood, however, that in some cases, there may be more body radial openings 12 than retaining tabs 32.

Each of the radially outwardly extending portion 36 preferably have a chamfered body engaging surface 43 which is able to operatively engage the corresponding angled tab engaging surface 13 of the corresponding body radial opening 12 in which the radially outwardly extending portion 36 extends. The chamfered body engaging surface 43 operatively engages the angled tab engaging surface 13 of the corresponding body radial opening 12 when the retaining ring 30 is relatively axially moved with respect to the fitting body 10 from the first locked axial position to the second unlocked axial position as described more fully below.

As described above, FIGS. 1, 2 and 3 show the pipe 2 in the inserted position and the retaining ring 30 in the first locked axial position. In this first locked axial position, the radially inwardly extending portions 31 engage the pipe 2 when the pipe 2 is in the inserted position to retain the pipe 2 in the inserted position. Each of the radially inwardly extending portions 31 preferably have a pipe retaining surface 34 for retaining the pipe 2 in the inserted position when the retaining ring 30 is in the first locked axial position. The pipe 2 preferably has at least one indentation, such as at least one groove 4, or at least one dimple (not shown) and the pipe retaining surface 34 of at least one radially inwardly extending portion 31 preferably engages such indentations, for example, by engaging an inner wall 5 of the groove 4 facing the pipe opening 102.

As also illustrated in FIG. 2, the connection 110 preferably has a stop wall 15 formed integrally with the fitting body 10. The stop wall 15 limits axial insertion of the pipe 2 into the fitting body 10 and specifically the pipe opening 102. This prevents an insertion end 9 of the pipe 2 from being overly inserted into the fitting body 10. Furthermore, the pipe retaining surface 34 of the at least one radially inwardly extending portion 31 has an axial position $A_R$ (see FIG. 2) in the fitting body 10 with respect to the stop wall 15 which corresponds to an axial position $A_G$ (see FIG. 2) of the at least one groove 4 with respect to an insertion end 9 of the pipe 2, such that the insertion end 9 of the pipe 2 is near, but not adjacent to, the stop wall 15 when the pipe 2 is in the inserted position, as illustrated for instance, in FIGS. 2 and 3.

As also illustrated in FIGS. 2 and 3, in a preferred embodiment, each of said radially outwardly extending portions 36 extend through the corresponding body radial opening 12 of the fitting body 10. In this way, the body radial openings 12 of the fitting body 10 are open to an exterior surface of the fitting body 10, as illustrated for instance in FIGS. 1, 2 and 3. This permits visible inspection of the radially inwardly extending portions 31 when they are engaging the pipe 2, and in particular, the at least one groove 4 or other indentation (not shown) when the pipe 2 is in the inserted position. In this way, physical inspection can be made whether or not the pipe 2 is in the inserted position (shown in FIGS. 1, 2 and 3), as well as whether or not the radially inwardly extending portions 31 have engaged the pipe 2.

In a further preferred embodiment, and presuming a water tight seal is desired, a gasket 50 may be located between the insertion end 9 of the pipe 2 and the retaining ring 30 when the pipe 2 is in the inserted position and the retaining ring 30 is in the first locked axial position, as illustrated for instance in FIG. 2. In this way, the gasket 50 may provide a seal to the fitting body 10 even if the radial openings 12 are open through to the exterior surface of the fitting body 10 permitting visible inspection of the radially inwardly extending portions 31 engaging the pipe 2 when the pipe 2 is in the inserted position and the retaining ring 30 is in the first locked axial position.

In a further preferred embodiment, as illustrated in FIG. 2 and detailed FIG. 3, each radial body opening 12 further preferably comprises a radial tab engaging surface, shown generally by reference numeral 18. The radial tab engaging surface 18 faces the angled tab engaging surface 13 of the body opening 12. Each of the radially outwardly extending portions 36 of the resilient retaining tabs 32 extends through the corresponding body opening 12 of the fitting body 10 as discussed above. Preferably, each radially outwardly extending portions 36 comprises an axial stop surface, shown generally by reference numeral 38 in FIG. 3, which engages the radial tab engaging surface 18 of the corresponding body opening 12 when the retaining ring 30 is being axially moved with respect to the fitting body 10 towards the pipe opening 102. In this way, the interaction of the radial tab engaging surface 18 of each body opening 12, and, the axial stop surface 38 of each radially outwardly extending portion 36 extending through the corresponding body radial opening 12 prevents relative axial movement of the retaining ring 30 in a direction towards the pipe opening 102 of the fitting body 10, and thereby prevent potentially undesirable removal of the retaining ring 30 from the fitting 100.

Furthermore, as also illustrated in FIG. 3, the radial tab engaging surface 18 of each radial body opening 12 is substantially perpendicular to the longitudinal axis $L_A$ of the fitting body 10. Similarly, it is preferred that the angled tab engaging surface 13 of each radial body opening 12 be oriented at an acute forward angle α to the longitudinal axis $L_A$. In this way, the radial tab engaging surface 18 acts as an axial stop for the radially outwardly extending portions 36 preventing undesired axial removal of the retaining ring 30 from the connection 110 and potentially unintentional removal from the fitting 100, and, the angled tab engaging surface 13 being at an acute forward angle α to the longitudinal axis $L_A$ facilitates the resilient radial outward deformation of each resilient retaining tab 32 to disengage the radially inwardly extending portion 31 from the pipe 2 as discussed more fully below.

With comparison of FIGS. 1, 2 and 3 showing the retaining ring 30 in the first locked axial position, and FIGS. 6, 7 and 8, showing the retaining ring 30 in the second unlocked axial position, it is apparent that relative axial movement of the retaining ring 30 with respect to the fitting body 10 from the first locked axial position to the second unlocked axial position causes the chamfered body engaging surface 43 of each radially outwardly extending portion 36 to operatively engage the angled tab engaging surface 13 of the corresponding body radial opening 12. In this way, each of the resilient retaining tabs 32 are resiliently radially outwardly deformed, which has the effect of causing the radially inwardly extending portion 31 of each of the resilient retaining tabs 32 to disengage from the pipe 2. This is illustrated for instance in FIGS. 6, 7 and 8 where the radially inwardly extending portions 31 have been removed from the groove 4. More particularly, the retaining surface 34 of the radially inwardly engaging portion 31 no longer engages the inner wall 5 of the at least one groove 4, because the angled tab engaging surface 13 of the corresponding body radial opening 12 has engaged the chamfered body engaging surface 43 of the corresponding radially outwardly extending portion 36 to resiliently radially outwardly deform the resilient retaining tab 32, disengaging the radially inwardly extending portion 31 from the indentation, in this preferred embodiment, the groove 4 on the pipe 2. When the retaining ring 30 is in the second unlocked axial position, and, the radially inwardly extending portions 31 no longer engages the pipe 2, the pipe 2 may be removed from the inserted position of the fitting body 10. In this way, the connection 110 may releasably disconnected the pipe 2 from the fitting 100 permitting removal of the pipe 2 from the fitting body 10.

Once the pipe 2 has been removed from the connection 110, both the connection 110 and the pipe 2 could be reused. In other words, the pipe 2 may be connected to the same connection 110, or a different connection 110 on another fitting (not shown). Likewise, the connection 110 on the second end 132 of the pipe coupling 101 shown in FIGS. 6, 7 and 8 could be reused with another pipe (not shown).

It is apparent that the relative axial movement of the retaining ring 30 with respect to the fitting body 10 from the first locked axial position to the second unlocked axial position results from the retaining ring 30 moving axially forward further into the fitting body 10. It should be appreciated that this relative axial movement can occur in any number of ways. For instance, it can be done through physical means or even through electromagnetic means if magnetic elements are used in the retaining ring 30. It is preferred that the relative axial movement of the retaining ring 30 with respect to the fitting body 10 from the first locked axial position to the second unlocked axial position results from the retaining ring 30 moving axially forward into the fitting body 10. This, in general, is a more difficult movement, particularly when removal of the pipe 2 requires axial movement in the opposite axial direction, thereby decreasing the likelihood of unauthorized or undesired improper movement of the retaining ring 30 to the second unlocked axial position, and undesired removal of the pipe 2 from the inserted position of the fitting body 10.

The relative interaction of each of the retaining tabs 32 with the corresponding body radial opening 12 as the retaining ring 30 moves axially forward with respect to the fitting body 10 from the first locked axial position to the second unlocked axial position will now be described in more detail with respect to a preferred embodiment illustrated in FIGS. 3 and 8. As illustrated in FIG. 3, when the retaining ring 30 is in the first locked axial position with respect to the body fitting 10, the chamfered body engaging surface 43 of each radially outwardly extending portion 36 is in an axial position, shown generally by reference $P_R$, which is axially offset from the angled tab engaging surface 13 of the corresponding body radial opening 12, shown generally by reference $P_B$, through which the radially outwardly extending portion 36 extends. By comparison, as illustrated in FIGS. 6, 7 and 8, when the retaining ring 30 is in the second unlocked axial position with respect to the body fitting 10, the chamfered body engaging surface 43 of each radially outwardly extending portion 36 is axially aligned with the angled tab engaging surface 13 of the corresponding body radial opening 12 illustrated by the axial positions $P_B$ and $P_R$ shown overlapping in FIGS. 6, 7 and 8, such that the chamfered body engaging surface 43 operatively engages the angled tab engaging surface 13 of the corresponding body radial opening 12. In this way, the operative interaction of the chamfered body engaging surface 43 of each radially outwardly extending portion 36 with the angled tab engaging surface 13 of the corresponding body radial opening 12 translates the relative axial movement of the retaining ring 30 with respect to the fitting body 10 from the first locked axial position to the second unlocked axial position into radial movement of each resilient retaining tab 32 from a radially locked position, as shown in FIG. 3 where the radially inwardly extending portion 31 is engaging the pipe 2 to retain the pipe 2 in the inserted portion, to a radially unlocked position, as shown in FIG. 8, where the radially inwardly extending portion 31 is disengaged from the pipe 2, permitting removal of the pipe 2 from the inserted position and the fitting body 10.

While the relative axial movement of the retaining ring 30 with respect to the fitting body 10 from the first locked axial position to the second unlocked axial position may be performed in a number of ways, in a preferred embodiment, the connection 110 comprises a removal tool, shown generally by reference numeral 80, to engage the retaining ring 30 facilitating relative axial movement of the retaining ring 30 with respect to the fitting body 10 from the first locked axial position to the second unlocked axial position. The removal tool 80 is shown in FIGS. 4 to 8, however, in FIGS. 4 and 5, the removal tool 80 is shown engaging the retaining ring 30 while the retaining ring 30 is still in the first locked axial position, and, in FIGS. 6 to 8, the removal tool 80 is shown engaging the retaining ring 30 while the retaining ring 30 is shown in the second unlocked axial position.

As illustrated in FIG. 5, the retaining ring 30 preferably comprises a removing tool engaging surface 48 which is located within or flush with the pipe opening 102 of the fitting body 10. The removal tool 80 preferably also comprises a retaining ring engaging surface 82 which engages the removing tool engaging surface 48 of the retaining ring 30 to facilitate relative axial movement of the retaining ring 30 with respect to the fitting body 10. Preferably, the retaining ring 30 is annularly shaped and substantially contained within the fitting body 10 when the pipe 2 is in the inserted position as shown in FIG. 5. More preferably, and is shown in FIG. 7, the annularly shaped retaining ring 30 has an outer diameter, shown generally by reference numeral $O_R$, which is less that the inner diameter, shown generally by reference numeral $I_P$ of the pipe opening 102, such that the retaining ring 30 is substantially contained within the pipe opening 102. In this way, the retaining ring 30 is concealed from, or at least not exposed to the outer elements, which lessens the likelihood that the retaining ring 30 would be moved unintentionally and undesirably from the first locked axial position to the second unlocked axial position. While the retaining ring 30 may have an outer diameter $O_R$ which is less than the inner diameter $I_P$ of the pipe opening 102, each of the radially outwardly extending portions 36 may extend radially outwardly through the corresponding body radial opening 12 of the fitting body 10 beyond the inner diameter $I_P$ of the pipe opening 102 to permit visual inspection of the movement of the radially outwardly extending portions 36 through the radial openings 12 to ensure the pipe 2 has been correctly engaged and/or disengaged from the connection 110.

Preferably, the removal tool 80 may fit between the pipe 2 and the pipe opening 102 of the fitting body 10 when the pipe 2 is in the inserted position to engage the removing tool engaging surface 48 of the retaining ring 30. In this way, axial movement of the removal tool 80 against the removing tool engaging surface 48 of the retaining ring 30 while holding the fitting body 10, permits axial movement of the retaining ring 30 forward and further into the pipe opening 102 of the fitting body 10 from the first locked axial position to the second unlocked axial position. In a preferred embodiment, the removal tool 80 may be composed of two parts that fit against at least a portion, and preferably all, of the removal tool engaging surface 48 of the retaining ring 30. The two parts of the removal tool 80 may be identical and fit together. In this way, the removal tool 80 may be able to apply equal axial force along the entire removal tool engaging surface 48 of the retaining ring 30 to provide even translation movement of the retaining ring 30 from the first locked axial position to the second unlocked axial position.

As illustrated in FIG. 5, in a preferred embodiment, the removing tool engaging surface 48 of the retaining ring 30 is located flush with the pipe opening 102 of the fitting body 10, shown generally by reference $P_F$, or slightly within the fitting body 10. In this way, the retaining ring 30 is protected by the pipe opening 102, and it is less likely that the retaining ring 30 will be improperly engaged and inadvertently moved axially forward, thereby unintentionally disengaging the connection 110. Furthermore, as also illustrated in FIG. 5, in a further preferred embodiment, the pipe 2 may have a further indentation or marking, such as the second groove, shown generally by reference numeral 8. This second groove 8 may be formed on the pipe 2 at the same time that the first groove 4 is formed. The second groove 8 may preferably also be located at the flush position $P_F$ of the pipe opening 102 of the fitting body 10 when the pipe 2 is in the inserted position, as illustrated in FIG. 5. In this way, the second groove 8 being aligned with the flush position $P_F$ at the entrance of the pipe opening 102 may act as a further visual indication to the user of the connection 110 that the pipe 2 is in the inserted position (as shown in FIGS. 1 to 5) and the radially inwardly extending portion 31 of the retaining tabs 32 has engaged the pipe 2 to retain the pipe 2 in the inserted position.

As discussed above, FIGS. 9 to 11 illustrate the initial insertion of the pipe 2 into the second end 132 of the pipe coupling 101 prior to the connection 110 engaging and connecting to the pipe 2. As illustrated in FIGS. 9, 10 and 11, the pipe 2 is axially inserted into the fitting body 10 through the pipe opening 102. As illustrated in the Figures, the pipe 2 is inserted into the pipe opening 102, the pipe 2 engages the radially inwardly extending portion 31 and resiliently radially outwardly deforms the resilient retaining tabs 32, permitting axial insertion of the pipe 2 into the pipe opening 102 of the fitting body 10. To facilitate axial insertion of the pipe 2, the pipe 2 preferably has a pipe chamfered edge, shown generally by reference numeral 3 in FIG. 11, at the insertion end 9 of the pipe 2. The pipe chamfered edge 3 preferably engages the chamfered pipe engaging surface 33 of the retaining tabs 32 during axial insertion of the pipe 2 to resiliently outwardly deform the resilient retaining tabs 32, permitting axial insertion of the pipe 2 to the inserted position.

As illustrated in the Figures, the inner diameter, shown by $I_R$, at the first end 131 of the pipe coupling 101 in FIG. 4 of the radially inwardly extending portions 31 when they are at rest, is less than the outer diameter $O_{DP}$ of the pipe 2. In this way, when the pipe 2 is inserted to the inserted position, resilient retaining tabs 32 are suddenly resiliently inwardly deformed into the external groove 4, or other indentions, permitting the pipe retaining surface 34 to engage the pipe 2. This sudden resilient inward deformation of the tabs 32, may make an audible sound, such as a snapping sound. This snapping sound is a further audible indication that the pipe 2 is in the inserted position and the radially inwardly extending portions 31 have engaged the pipe 2.

As illustrated in FIG. 11, in a preferred embodiment, the pipe 2 has a groove 4 with at least the inner wall 5 as discussed above. The insertion of the pipe 2 into the pipe opening 102 to the inserted position causes the pipe retaining surface 34 of at least one radially inwardly extending portion 31 to operatively engage the inner wall 5 of the at least one external groove 4 of the pipe 2 to retain the pipe 2 in the inserted position while the retaining ring 30 remains in the first locked axial position.

Accordingly, various preferred embodiments and features of the releasable connect/disconnect connection 110 have been described. It is understood that the connection fitting 110 of the present invention has been described with respect to a particular type of pipe fitting 100, namely a pipe coupling 101, but it is understood that the invention is not limited to pipe couplings 101. Rather, the present invention may be used with any type of pipe fitting 100. In particular, the connection 110 of the present invention could be used with elbow fittings, tee fittings, wye fittings, pipe reducing fittings and pipe expanding fittings, P traps, S traps, and end caps, to provide a few non-limiting examples. This fitting connection of the present invention is not limited to pipe fitting, but could also be used with flanges and other applications to replace solvent welded joints or connections.

It is understood that no element, act or implementation described in this description of the present application should be construed as essential to the invention or critical to the implementation, unless explicitly described as such. Also, where only one item is intended, the term "one" or similar language is used, but it is understood that the article "a" is intended to include one or more items. Furthermore, the word "comprising" is intended to mean including, unless explicitly stated otherwise.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A connection to connect and disconnect a pipe to a fitting, the connection comprising:
   a fitting body having a pipe opening for axially receiving a pipe along a longitudinal axis and having at least one body radial opening, each body radial opening having an angled tab engaging surface;
   a retaining ring having at least one axially extending resilient retaining tab, each resilient retaining tab having a radially inwardly extending portion and a radially outwardly extending portion;
   wherein each of said radially outwardly extending portions have a chamfered body engaging surface which operatively engages the angled tab engaging surface of a corresponding body radial opening;

wherein said radially inwardly extending portions engage the pipe when the pipe is in an inserted position and the retaining ring is in a first locked axial position to retain the pipe in the inserted positon;

wherein in the first locked axial position, the retaining ring is substantially contained within the fitting body so as not to extend beyond the pipe opening; and wherein relative axial movement of the retaining ring with respect to the fitting body from the first locked axial position to a second unlocked axial position causes the chamfered body engaging surface of each radially outwardly extending portion to operatively engage the angled tab engaging surface of the corresponding body radial opening to resiliently radially outwardly deform each resilient retaining tab disengaging the radially inwardly extending portions from the pipe to permit removal of the pipe from the inserted position in the fitting body.

2. The connection as defined in claim 1, wherein the relative axial movement of the retaining ring with respect to the fitting body from the first locked axial position to the second unlocked axial position results from the retaining ring moving axially forward into the pipe opening of the fitting body.

3. The connection as defined in claim 1, wherein, in the first locked axial position, the chamfered body engaging surface of each radially outwardly extending portion is axially offset from the angled tab engaging surface of the corresponding body radial opening, and, in the second unlocked axial position the chamfered body engaging surface of each radially outwardly extending portion is axially aligned with the angled tab engaging surface of the corresponding body radial opening such that the chamfered body engaging surface operatively engages the angled tab engaging surface to translate the relative axial movement of the retaining ring with respect to the fitting body from the first locked axial position to the second unlocked axial position into radial movement of each resilient retaining tab from a radially locked position, where the radially inwardly extending portion is engaging the pipe to retain the pipe in the inserted position, to a radially unlocked position, where the radially inwardly extending portion is disengaged from the pipe, permitting removal of the pipe from the inserted position in the fitting body.

4. The connection as defined in claim 1, further comprising a removal tool to relatively axially move the retaining ring with respect to the fitting body from the first locked axial position to the second axial unlocked position;

wherein said removal tool engages the retaining ring to relatively axially move the retaining ring with respect to the fitting body.

5. The connection as defined in claim 4, wherein the retaining ring is annularly shaped and comprises a removal tool engaging surface which is located within or flush with the pipe opening of the fitting body; and wherein said removal tool fits within the pipe opening between the pipe in the inserted position and the pipe opening of the fitting body to engage the removal tool engaging surface of the retaining ring and axially move the retaining ring forward into the pipe opening of the fitting body from the first locked axial position to the second unlocked axial position.

6. The connection as defined in claim 1, each of said radially outwardly extending portions extends through the corresponding body radial opening of the fitting body, and, the body radial openings of the fitting body are open to an exterior surface of the fitting body to permit visible inspection of the radially inwardly extending portions engaging the pipe when the pipe is in the inserted position.

7. The connection as defined in claim 6 further comprising a gasket axially located between an inserted end of the pipe and the retaining ring when the pipe is in the inserted position and the retaining ring is in the first locked axial position to seal the fitting.

8. The connection as defined in claim 1, wherein each of said radially inwardly extending portions have a pipe retaining surface for retaining the pipe in the inserted position when the retaining ring is in the first locked axial position;

wherein axial insertion of the pipe into the fitting body causes the pipe to resiliently radially outwardly deform the resilient retaining tab permitting axial insertion of the pipe in the fitting body; and wherein continued insertion of the pipe into the pipe opening to the inserted position when the retaining ring is in the first locked axial position causes the pipe retaining surface to engage the pipe and retain the pipe in the inserted position.

9. The connection as defined in claim 8, wherein the pipe has at least one external groove which operatively engages the pipe retaining surface of at least one radially inwardly extending portion when the pipe is in the inserted position and the retaining ring is in the first locked axial position.

10. The connection as defined in claim 9, wherein the at least one external groove has inner wall facing the pipe opening such that insertion of the pipe into the pipe opening to the inserted position causes the pipe retaining surface of at least one radially inwardly extending portion to operatively engage the inner wall of the at least one external groove and retain the pipe in the inserted position while the retaining ring remains in the first locked axial position.

11. The connection as defined in claim 10, wherein the inner diameter of the radially inwardly extending portions is less than the outer diameter of the pipe such that when the resilient retaining tabs is resiliently inwardly deformed into the external groove permitting the pipe retaining surface to engage the pipe, a snapping sound is made.

12. The connection as defined in claim 11 wherein each of said radially inwardly extending portions have a chamfered pipe engaging surface facing the opening of the fitting body which engages the pipe during axial insertion thereof to resiliently outwardly deform the resilient retaining tab permitting axial insertion of the pipe to the inserted position in the fitting body.

13. The connection as defined in claim 12 further comprising a stop wall which limits axial insertion of the pipe into the fitting body; and wherein the pipe retaining surface of the at least one radially inwardly extending portion has an axial position in the fitting body with respect to the stop wall which corresponds to an axial position of the at least one groove with respect to an insertion end of the pipe such that the insertion end of the pipe is near but not adjacent the stop wall when the pipe is in the inserted position.

14. The connection as defined in claim 1 wherein each radial body opening further comprises a radial tab engaging surface facing the angled tab engaging surface and each of said radially outwardly extending portions extends through the corresponding body radial opening of the fitting body and comprise an axial stop surface which engages the radial tab engaging surface to prevent relative axial movement of the retaining ring in a direction toward the pipe opening of the fitting body.

15. The connection as defined in claim 14 wherein the radial tab engaging surfaces are substantially perpendicular to a longitudinal axis of the fitting body and the angled tab engaging surfaces are oriented at an acute forward angle to the longitudinal axis.

16. The connection as defined in claim 15 wherein the retaining ring is annularly shaped with an outer diameter which is less than the inner diameter of the pipe opening such that the retaining ring is substantially contained within the pipe opening; and wherein each of said radially outwardly extending portions extend radially through the corresponding body radial opening of the fitting body beyond the inner diameter of the pipe opening.

* * * * *